Patented Aug. 20, 1940

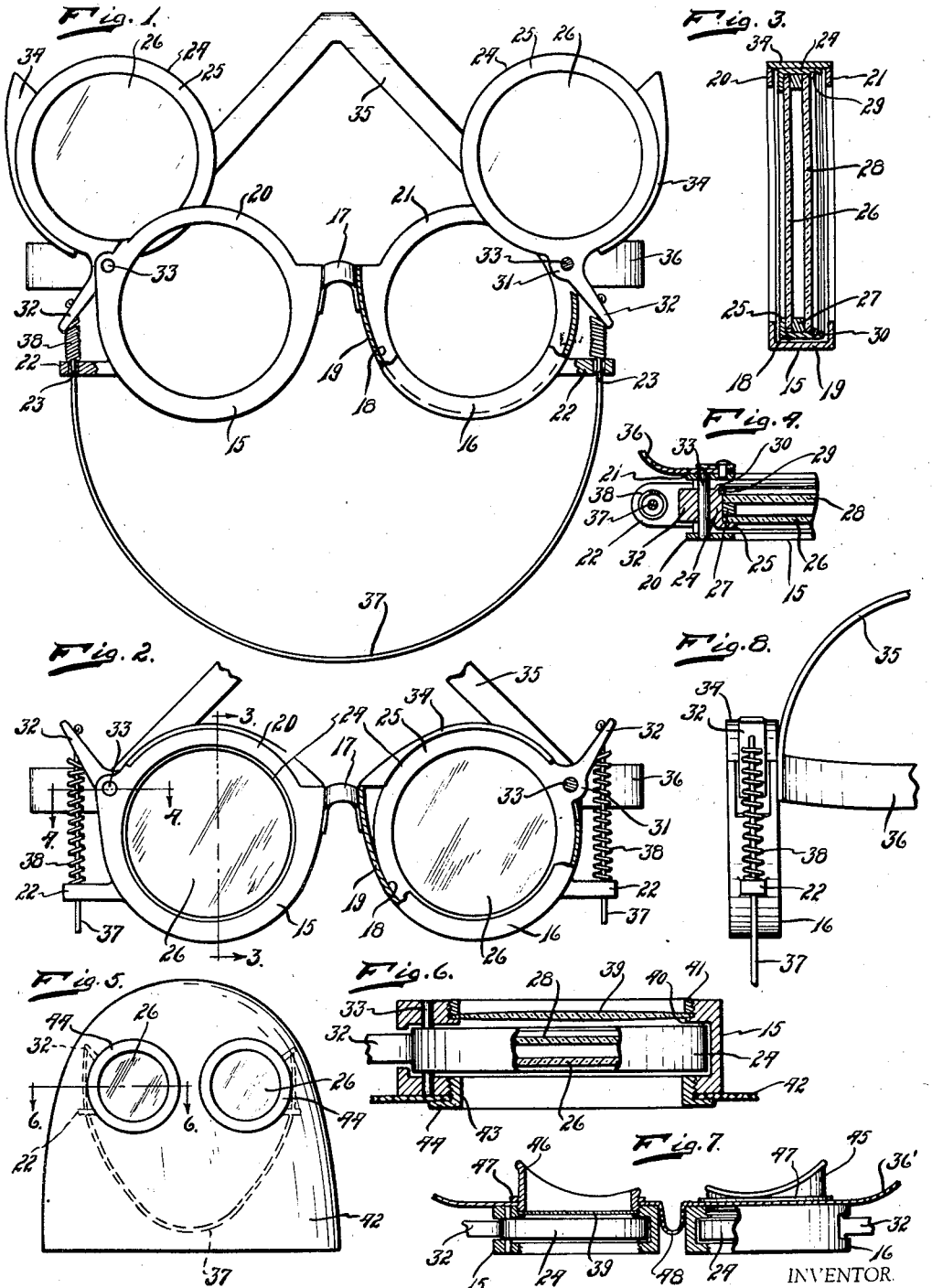

2,212,014

UNITED STATES PATENT OFFICE 2,212,014

SHIELDING DEVICE FOR THE EYES

James C. Doyle, Detroit, Mich.

Application October 21, 1938, Serial No. 236,130

6 Claims. (Cl. 2—8)

My invention relates to a new and useful improvement in a shielding device for the eyes adapted for use primarily by welders and the like who find it necessary to have positioned before the eyes a shield which may be easily and quickly moved to non-shielding position to permit a clear vision.

In welding operations it is quite frequently necessary that the operator have a clear vision of the object operated upon immediately prior to beginning the welding operation and in some instances immediately after the ending of the welding operation or an interruption of it. It is also necessary that the welder have a light filtering shield which may be positioned before his eyes during the welding operation.

It is an object of the present invention to provide a device so arranged and constructed that the clear vision will be obtained and the shielding effect also present when desired.

It is another object of the invention to provide a shielding device of this class which may be easily and quickly moved from shielding to non-shielding position by a movement of the welder's chin.

Another object of the invention is the provision of a shielding device of this class so arranged and constructed that it will be adapted for various uses such as with a pair of goggles, a rigid head shield or a flexible head shield.

Another object of the invention is the provision of a device of this class which will be simple in structure, economical of manufacture, durable, light and compact.

Other objects will appear hereinafter.

The invention consists in the combination and arrangement of parts hereinafter described and claimed.

The invention will be best understood by a reference to the accompanying drawing which forms a part of this specification, and in which, Fig. 1 is a front elevational view of the invention with parts broken away and parts shown in section.

Fig. 2 is a view similar to Fig. 1 with parts broken away and parts shown in section showing the shielding lens in shielding position.

Fig. 3 is a sectional view taken on line 3—3 of Fig. 2.

Fig. 4 is a sectional view taken on line 4—4 of Fig. 2.

Fig. 5 is a front elevational view showing the invention used with a flexible hood.

Fig. 6 is a sectional view taken on line 6—6 of Fig. 5.

Fig. 7 is a top plan view with parts broken away and parts shown in section showing a modified use of the invention.

Fig. 8 is an enlarged fragmentary view illustrating the operating mechanism.

As shown in the drawing I provide a pair of frames 15 and 16 which are connected together by a connecting member 17. This connecting member 17 may be made flexible or rigid as desired. Each of the frames 15 and 16 and the associated parts is a duplicate of the other so that a description of one will suffice for both.

The lower portion of each of these frames is formed channel-shaped to provide the channel 18. The base 19 of this channel-shaped portion is cut away at the upper part to provide a pair of spaced rings 20 and 21. Projecting outwardly from adjacent the lower portion of each of these frames 15 and 16 is a lug 22 having an opening 23 formed therethrough. Swingably mounted to and adapted for swinging between the walls or rings 20 and 21, is a circular frame 24 having at one side an inwardly projecting flange 25 against which is adapted to engage a transparent closure 26 formed from glass or the like spaced by the spacing ring 27 from a translucent or light filtering plate or lens 28 which is held in position by means of the split resilient ring 29 positioned under the inwardly projecting lip or inclined flange 30 extending inwardly from the opposite side of the ring 24. This ring 24 is provided with a lug 31 projecting outwardly from which is an arm 32. A pivot pin 33 extends through the lug 31 and serves to swingably mount the ring 24 between the walls or rings 20 and 21. The ring 24 on its upper portion, carries a plate 34 which projects beyond opposite sides thereof and serves as a closure when in engagement with the side walls or rings 20 and 21 so as to prevent fly particles of material from entering the channel 18.

In one form of the structure, as illustrated in Fig. 8, there is secured at its opposite ends to the frames 15 and 16 an elastic strap 35 which, when the device is in use, passes across the top of the wearer's head. An elastic strap 36 is also secured at its opposite ends to the device and passes around the back of the wearer's head to accurately hold the frames 15 and 16 in position over the eyes. The opposite ends of an operating band 37, which may be formed from wire or the like, are secured to the arms 32 and slideably projected through the openings 23, a coil spring 38 embracing this band 37 adjacent its opposite ends and engaging at one of its ends against the lugs 22. The construction is such that when the device is placed on the head of a wearer, the bands 35 and 36 will retain the construction in position on the head with the frames 15 and 16 positioned in front of the eyes and the member 37 will pass under the same. The band 37 will be of such a length that when the operator opens his mouth, the band 37 will serve to rock the frames 24 on their pivot and raise them into the elevated position shown in Fig. 1 which is the non-shielding position. When this pressure is released, the springs 38 will serve to move the rings 24 into the position shown in Fig. 2 which is the shielding position.

In welding operations it is desirable that the eyes of the welder be protected from the glare of the welding flash and while the welding operation is being performed the frames 24 will be in shielding position as shown in Fig. 2 so that a light filtering plate 28 will function to protect the eyes of the operator. The plate 26 serves to protect the plate 28 from flying pieces of material and particularly from sparks or small pieces of hot metal. This plate 26 may be made of ordinary glass which is much less expensive to fabricate than the colored glass plate 28 which serves as the filtering element. When the operator opens his mouth to elevate the members 24 into non-shielding position, a clear vision is afforded through the frames 15 and 16. As shown in Fig. 6 these frames 15 and 16 may be provided with a lens 39 engaging the inwardly projecting flange 40 on the ring 15 or 16. This lens 39 will be held in position by the screw ring 41. The lens 39 may be a prescription lens, that is, a lens ground to such shape and dimensions as the optical or eye glass lens worn by the operator. With the prescription lens of this type mounted in position, it is obvious that the operator is thus provided with a protective device having the movable shielding member and at the same time also provided with a pair of glasses corresponding to the glasses usually worn by the operator. If desired, the lens 39 instead of being a prescription lens may consist of material burnished on its outer surface and provided on its lower surface with a light reflecting substance through which the operator may peer, this type of construction being commonly known as a transparent mirror.

In Fig. 5 I have illustrated the device used with a flexible head shield which is formed from flexible fabric 42 having openings therein through which the securing rings 43 may be projected so that the flanges 44 thereof will serve to clamp the fabric against the face of the rings 15 and 16.

In Fig. 7 I have illustrated the device used with cups 45 and 46 which are threaded into the inner ends of the frames 15 and 16 and to which the ends of the band 36' are secured. These cups are also provided with a flange 47 adapted to clamp a one piece fabric mask 48 in position. In this construction the shielding and non-shielding operation is carried on as already described while a pair of goggles is thus connected to the structure.

It is believed obvious that other variations and modifications of the invention may be made without departing from the spirit of the invention and it is the intention that such have been embraced within the scope of the appended claims.

I claim:

1. A shielding device of the class described, comprising: a supporting frame having a pair of spaced openings formed therein, said frame surrounding the lower half of said openings being channel-shaped, the channels opening upwardly; a shielding device for each of said openings comprising a closure-bearing frame; a translucent closure for each of said closure-bearing frames; a transparent closure for each of said closure-bearing frames; means for maintaining said closures in spaced relation; means for swingably mounting said closure-bearing frames on said supporting frame for swinging upwardly out of said channels into inoperative position, said channels serving as a guide for said closure-bearing frames in their swingable movement.

2. A shielding device of the class described, comprising: a supporting frame having a pair of spaced openings formed therein; said frame, surrounding the lower half of said openings, being formed channel-shaped in cross section, the channels opening upwardly; a shielding device for each of said openings comprising a closure bearing frame; closures mounted in said closure-bearing frames; means for swingably mounting said closure-bearing frames on said supporting frame for swinging downwardly into operative position into said channels and upwardly into in-operative position out of said channels, said channels serving as guide during said swinging movement; and means for swinging said closure-bearing frames into inoperative position; and means for swinging said closure bearing frames into operative position.

3. A shielding device of the class described, comprising: a supporting frame having a pair of spaced openings formed therein, said frame surrounding the lower half of said openings being channel shaped, the channel opening upwardly, the frame surrounding the upper half of said openings being planar; a shielding device for each of said openings comprising a closure bearing frame; a closure for each of said closure bearing frames; means for swingably mounting said closure bearing frame on said supporting frame for swinging upwardly out of said channels into inoperative position and downwardly into said channels into operative position.

4. A shielding device of the class described, comprising: a supporting frame having a pair of spaced openings formed therein, said frame surrounding the lower half of said openings being channel shaped, the channel opening upwardly, the frame surrounding the upper half of said openings being planar; a shielding device for each of said openings comprising a closure bearing frame; a closure for each of said closure bearing frames; means for swingably mounting said closure bearing frame on said supporting frame for swinging upwardly out of said channels into inoperative position and downwardly into said channels into operative position; an arm projecting outwardly from each of said closure bearing frames; a lug projecting outwardly from said supporting frame at opposite sides thereof, there being an opening to each of said lugs and a flexible member passed through each of said lugs and connected at its ends to one of said arms to provide an operating loop for swinging said closure bearing frame into inoperative position.

5. A shielding device of the class described, comprising: a supporting frame having a pair of spaced openings formed therein, said frame surrounding the lower half of said openings being channel shaped, the channel opening upwardly, the frame surrounding the upper half of said openings being planar; a shielding device for each of said openings comprising a closure bearing frame; a closure for each of said closure bearing frames; means for swingably mounting said closure bearing frame on said supporting frame for swinging upwardly out of said channels into inoperative position and downwardly into said channels into operative position; an arm projecting outwardly from each of said closure bearing frames; a lug projecting outwardly from said supporting frame at opposite sides thereof, there being an opening to each of said lugs and a flexible member passed through each of said lugs and connected at its ends to one of said arms to provide an operating loop for swinging said closure bearing frame into inoperative position; and a pair of springs each engaging, at one of its ends, one of said lugs and, at its opposite end, one of said arms for normally maintaining said closure bearing frames swung into operative position.

6. In a shielding device of the class described, a supporting frame having a pair of spaced openings formed therein, said frame surrounding the lower half of said openings being channel shaped, the channel opening upwardly, the frame surrounding the upper half of said openings being planar; a shielding device for each of said openings comprising a closure bearing frame for the reception of a pair of axially aligned closures; a translucent closure for each of said closure bearing frames; a transparent closure for each of said closure bearing frames; means for maintaining said closures in spaced relation; means for swingably mounting said closure bearing frames on said supporting frame for swinging upwardly out of said channels into inoperative position and downwardly into said channels into operative position; a shielding plate extending around the upper portion of each of said closure bearing frames and projecting outwardly therefrom at opposite sides thereof for closing the upper end of the channel of the channel shaped portion of said supporting frame upon swinging of the closure bearing frame into operative position.

JAMES C. DOYLE.